UNITED STATES PATENT OFFICE.

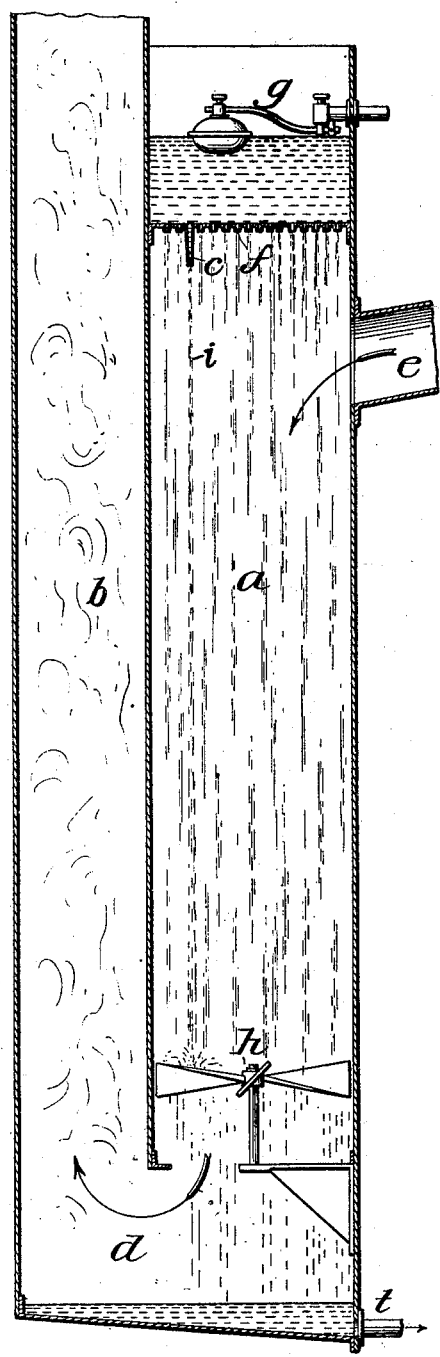

ALEXANDER LÉON LION, OF PARIS, FRANCE.

APPARATUS FOR PURIFYING GASES.

SPECIFICATION forming part of Letters Patent No. 679,761, dated August 6, 1901.

Application filed April 27, 1899. Serial No. 714,717. (No model.)

*To all whom it may concern:*

Be it known that I, ALEXANDER LÉON LION, a citizen of the Republic of France, and a resident of Paris, France, have invented certain new and useful Improvements in Apparatus for Purifying Gases, of which the following is a specification.

This invention relates to an apparatus for the purification of large volumes of gases and the like, such as smoke, in order to free the same from coal-dust and other solid products, thus effecting the consumption of smoke and the filtration of air intended for aerating purposes in order to free the same from dust and bacteria which may be held in suspension.

The drawing represents the apparatus in vertical section.

My apparatus is designed to filter the gaseous mass, whether smoke or air, by causing it to pass through a spray of water. This spray being composed of tenuous particles of liquid acts in the manner of a filtering substance, and the gaseous mass is freed in it from all the solid impurities and dust which it may hold in suspension. In the case of smoke these are the particles of carbon and solid products which impart to the smoke its black color, and in the case of air the impurities and dust which contains it and which it holds in suspension. Such a system of filtration does not necessitate any cleansing operation, as the impurities contained in the gaseous masses are precipitated by the liquid-spray and are discharged by the liquid formed by the union of these fine liquid drops or particles. My improved method therefore presents, in the case of the purification of air, for example, considerable advantages as compared with the filters in which filtration is effected by causing the air to pass through fabrics or filamentous substances. In these latter these substances or fabrics retain all the impurities and dust and eventually becomes a case of pollution for the air which traverses them. In addition to this it is necessary that the air should be forced through them at a considerable pressure, whereas my method of effecting filtration renders this unnecessary.

One of the most important uses to which my form of filter may be adapted consists in its employment for producing smoke consumption in manufacturing and other furnaces.

Referring to the drawing, the smoke enters at $e$ the upper portion of a column down which falls a fine spray from a water-reservoir arranged above this column, in which the level is maintained constant by means of a float $g$. The smoke passes through this column $a$ in a downward direction and issues therefrom into a passage $b$. The bottom of the water-reservoir is constituted by a perforated plate $f$, which plate is preferably provided at each of its perforations with a small nozzle, which insures the formation of a fine jet of the liquid and prevents these jets from uniting with the adjacent jets. These small nozzles may be of any suitable kind. At the lower portion of the column $a$ is arranged a horizontal screw $h$, upon which fall the jets of water. Owing to the fall of these latter, this screw $h$ is caused to rotate at a high speed, and thus produce an intimate mixing of the smoke and the drops of water. The smoke is thus entirely freed from all the products of combustion—such as blacks, carbon-dust, &c. The water charged with these impurities issues from the apparatus at $t$. It is only necessary that the screw $h$ should receive the quantity of water sufficient to produce at the place where it rotates a whirl which will precipitate the solid matters held in suspension in the air or gas which is being purified. Thus a single jet $i$ falling upon the periphery of the screw is of itself sufficient to cause the rotation of this latter, and the quantity of water supplied by it, being dispersed by the screw, is sufficient to furnish the necessary water-spray and to free the smoke from its impurities.

I do not wish to limit myself to the form of casing or shell shown in the drawing, which is free from baffle-plates on its inner side, as other forms of shell may be employed.

In the application of my invention to the filtration of air a very large volume of air may be supplied, and the apparatus is especially adapted for the ventilation of large buildings—such as theaters, schools, hospitals, barracks, dormitories, restaurants, &c., a great quantity of air absolutely free from germs being supplied and at a merely nominal cost. My filter may also be adapted to new hot-air heating appliances or to those already in use and insures a thorough distribution of pure air in buildings heated by such stoves. It is not necessary to enter into the special arrangements which this adaptation of my filter may demand, as this is merely a question of architectural or building modifications.

What I claim is—

In combination, a vertical conduit having an air or gas inlet in its side wall near its upper end, a perforated spraying-diaphragm located above said opening, means for supplying water above said diaphragm and a rotating fan located at the lower end of said conduit, substantially as described.

In witness whereof I have hereunto set my hand in presence of two witnesses.

ALEXANDER LÉON LION.

Witnesses:
GUSTAVE DUMONT,
EDWARD P. MACLEAN.